United States Patent [19]
Benazzi et al.

[11] Patent Number: 6,106,698
[45] Date of Patent: Aug. 22, 2000

[54] CATALYST COMPRISING A ZEOLITE SELECTED FROM THE GROUP FORMED BY NU-85, NU-86 AND NU-87 ZEOLITES AND ITS USE FOR HYDROCONVERTING HYDROCARBON-CONTAINING PETROLEUM FEEDS

[75] Inventors: Eric Benazzi, Chatou; Nathalie George-Marchal, Saint Genis Laval; Slavik Kasztelan, Rueil Malmaison, all of France

[73] Assignee: Institut Francais du Petrole, France

[21] Appl. No.: 09/257,932

[22] Filed: Feb. 26, 1999

[30]     Foreign Application Priority Data

Feb. 26, 1998 [FR] France ................... 98/02213
Feb. 27, 1998 [FR] France ................... 98/02441

[51] Int. Cl.⁷ .................................................. C10G 47/00
[52] U.S. Cl. .................. 208/111.3; 208/109; 208/111.35; 208/111.01; 502/63; 502/64; 502/66; 502/74
[58] Field of Search .................. 208/109, 111.3, 208/111.35, 111.01; 502/63, 64, 66, 74

[56]              References Cited

U.S. PATENT DOCUMENTS

| 4,427,786 | 1/1984  | Miale et al. |
|-----------|---------|--------------|
| 4,613,720 | 9/1986  | Bonifaz et al. |
| 5,254,787 | 10/1993 | Dessau . |
| 5,464,799 | 11/1995 | Casci et al. .................. 502/65 |
| 5,648,558 | 7/1997  | Hatano et al. ................ 568/618 |
| 5,932,088 | 8/1999  | Benazzi et al. ............... 208/27 |
| 5,969,203 | 10/1999 | Dorbon et al. ................ 585/324 |
| 6,036,846 | 3/2000  | Benazzi et al. .............. 208/111.3 |

FOREIGN PATENT DOCUMENTS

| 0 377 291 | 7/1990 | European Pat. Off. . |
| 0 378 916 | 7/1990 | European Pat. Off. . |
| 0 463 768 | 1/1992 | European Pat. Off. . |
| 0 600 483 | 6/1994 | European Pat. Off. . |

*Primary Examiner*—Tom Dunn
*Attorney, Agent, or Firm*—Millen, White, Zelano & Branigan, P.C.

[57]              ABSTRACT

The invention provides a hydrocracking catalyst comprising at least one matrix, a zeolite selected from the group formed by NU-85, NU-86 and NU-87 zeolites, at least one metal selected from the group formed by metals from group VIB and VIII of the periodic table, at least one element selected from the group formed by boron and silicon, optionally phosphorous, optionally at least one group VIIA element, and optionally at least one group VIIB element. The invention also relates to the use of the catalyst for hydrocracking hydrocarbon feeds.

24 Claims, No Drawings

CATALYST COMPRISING A ZEOLITE SELECTED FROM THE GROUP FORMED BY NU-85, NU-86 AND NU-87 ZEOLITES AND ITS USE FOR HYDROCONVERTING HYDROCARBON-CONTAINING PETROLEUM FEEDS

The present invention relates to a catalyst for hydrocracking hydrocarbon-containing feeds, said catalyst comprising at least one metal selected from the group formed by metals from group VIB and VIII (group 6 and/or groups 8, 9 and 10 in the new periodic table notation: Handbook of Chemistry and Physics, 76$^{th}$ edition. 1995–1996), combined with a support comprising an amorphous or low crystallinity oxide type support and a zeolite selected from the group formed by NU-85, NU-86 and NU-87 zeolites. The catalyst matrix comprises, as a promoter, at least one element selected from boron and silicon, and optionally phosphorous, and optionally at least one group VIIA element (group 17, the halogens), in particular fluorine, and optionally at least one group VIIB element.

Hydrocracking heavy petroleum feeds is a very important refining process which produces lighter fractions such as gasoline, jet fuel and light gas oil from surplus heavy feeds which are of low intrinsic value, which lighter fractions are needed by the refiner so that he can match production to demand. Certain hydrocracking processes can also produce highly purified residues which can constitute excellent bases for oils. The importance of catalytic hydrocracking over catalytic cracking is that it can provide very good quality middle distillates, jet fuels and gas oils. The gasoline produced has a much lower octane number than that from catalytic cracking.

Catalysts used for hydrocracking are generally bifunctional, combining an acid function and a hydrogenating function. The acid function is supplied by large surface area supports (150 to 800 m$^2$/g in general) with a superficial acidity, such as halogenated aluminas (in particular fluorinated or chlorinated), amorphous silica-aluminas and zeolites.

The hydrogenating function is supplied either by one or more metals from group VIII of the periodic table, such as iron, cobalt, nickel, ruthenium, rhodium, palladium, osmium, iridium or platinum, preterably cobalt, nickel or iron, or by a combination of at least one metal from group VI of the periodic table, such as molybdenum, tungsten, or chromium, and at least one metal from group VIII.

The equilibrium between the two, acid and hydrogenating, functions is the fundamental parameter which governs the activity and selectivity of the catalyst. A weak acid function and a strong hydrogenating function produces low activity catalysts which generally operate at a high temperature (390° C. or above), and at a low supply space velocity (HSV, expressed as the volume of feed to be treated per unit volume of catalyst per hour, and is generally 2 h$^{-1}$ or less), but have very good selectivity for middle distillates. In contrast, a strong acid function and a weak hydrogenating function produces active catalysts but selectivities for middle distillates are poorer. The search for a suitable catalyst is thus centered on the proper choice of each of the functions to adjust the activity/selectivity balance of the catalyst.

One of the main points of hydrocracking is to exhibit high flexibility at various levels: flexibility in the catalysts used, which results in flexibility in the feeds to be treated and in the products obtained. One parameter which is easy to control is the acidity of the catalyst support.

The vast majority of conventional catalytic hydrocracking catalysts are constituted by weakly acidic supports such as amorphous silica-aluminas. More particularly, such systems are used to produce very good quality middle distillates and, when their acidity is very low, oil bases.

Weakly acid supports include amorphous silica-aluminas. Many catalysts on the hydrocracking market are based on silica-alumina combined either with a group VIII metal or, as is preferable when the amount of heteroatomic poisons in the feed to be treated exceeds 0.5% by weight, a combination of sulphides of groups VIB and VIII metals. The selectivity for middle distillates of such systems is very good, and the products formed are of high quality. The least acidic of such catalysts can also produce lubricating bases. The disadvantage of all such amorphous support-based catalytic systems is, as already stated, their low activity.

The catalytic activity of catalysts comprising Y zeolite with structure type FAU or catalysts containing a beta type zeolite are higher than that of amorphous silica-aluminas, but selectivities for light products are higher.

Research carried out by the Applicant on a number of zeolites and crystallised microporous solids have led to the discovery that, surprisingly, a catalyst containing a zeolite selected from the group formed by NU-85, NU-86 and NU-87 zeolites, at least one metal selected from the group formed by metals from group VIB and group VIII of the periodic table, at least one element selected from boron and silicon, optionally phosphorous, optionally at least one element from group VIIA, and optionally at least one element from group VIIB, can achieve higher activities, i.e., a higher degree of conversion, than prior art catalysts.

The hydrogenating function is selected from group VIII metals such as iron, cobalt, nickel, ruthenium, rhodium, palladium, osmium, iridium or platinum. and from metals from group VIB, such as molybdenum, tungsten, or chromium.

The optional group VIIA element is selected from fluorine, chlorine, bromine and iodine, preferably fluorine or chlorine. The group VIIB element is selected from manganese and rhenium.

More precisely, the invention provides a composition comprising at least one matrix and a select selected from the group formed by NU-85, NU-86 and NU-87 zeolites.

The NU-85 zeolite used in this patent has been described in European patent EP-A2-0 462 745, which patent is hereby incorporated into the present description by reference.

The NU-85 zeolites forming part of the composition of the invention are use with the silica and aluminium contents obtained on synthesis.

The NU-86 zeolite as used in the invention, in its hydrogen form or partially in its hydrogen form, designated H-NU-86 and obtained by calcining and/or ion exchange of as synthesised NU-86, and the method of synthesising said as synthesised NU-86, are described in European patent EP-A2-0 463 768.

The structure type of this zeolite has not yet been officially attributed by the synthesis commission of the IZA (International Zeolite Association). However, following the work published at the $_9$$^{th}$ International Zeolite Conference by J. L Casci, P. A. Box and M. D. Shannon ("Proceedings of the 9$^{th}$ International Zeolite Conference". Montreal 1992, Eds R. Von Ballmoos et al., 1993, Butterworth), it appears that:

NU-86 zeolite has a three-dimensional microporous system;

the three-dimensional microporous system is constituted by straight channels with a pore opening which is delimited by 11 T atoms (T being a tetrahedral atom: Si, Al, Ga, Fe . . . ), straight channels which are alternately delimited by openings with 10 and with 12 T atoms, and sinusoidal channels which are also alternately delimited by openings with 10 and with 12 T atoms.

The term "pore openings with 10, 11 or 12 tetrahedral atoms (T)" means pores constituted by 10, 11 or 12 sides.

The NU-86 zeolite used in the composition of the invention is at least in part, preferably almost completely, in its acid form, i.e., in its hydrogen form (H+). The Na/T atomic ratio is generally less than 90% and preferably less then 50%, more preferably less than 10%.

The NU-87 with structure type NES also used in the present invention has been described in EP-A1-0 377 291 and in the publication "Atlas of Zeolite Structure Types" by W. M. Meier, D. H. Olson and Ch. Baerlocher, Fourth revised edition 1996, Elsevier.

The NU-85, NU-86 and NU-87 zeolites are preferably used at least partially in their acid form (and preferably completely in their H form) or partially exchanged with metal cations, for example alkaline-earth metal cations.

The NU-85, NU-86 and NU-87 zeolites used in the composition of the invention are used with the silica and aluminium contents obtained on synthesis.

The catalyst of the present invention also comprises at least one amorphous or low crystallinity oxide type porous mineral matrix. Non limiting examples are aluminas, silicas and silica-aluminas. Aluminates can also be used. Preferred matrices contain alumina, in any of the forms known to the skilled person, more preferably aluminas, for example gamma alumina.

The catalyst is also characterized in that it comprises at least one element selected from boron and silicon and optionally phosphorous, optionally at least one group VIIA element, preferably fluorine, and also optionally at least one group VIIB element. The catalyst also comprises a hydrogenating function. The hydrogenating function per se has been defined above, i.e., at least one metal selected from the group formed by group VIB and group VIII metals.

The catalyst of the present invention also comprises at least one metal selected from the following groups and with the following contents, in weight % with respect to the total catalyst weight:

0.1% to 60%, preferably 0.1% to 50%, more preferably 0.1% to 40%, of at least one metal selected from the group formed by group VIB and group VIII metals:

0.1% to 99%, preferably 1% to 99%, of at least one amorphous or low crystallinity oxide type porous mineral matrix;

0.1% to 90%, preferably 0.1% to 80%, more preferably 0.1% to 70%, of a zeolite selected from the group formed by NU-85, NU-86 and NU-87 zeolites;

said catalyst being characterized in that it comprises:

0.1% to 20%, preferably 0.1% to 15%, more preferably 0.1% to 10%, of at least one promoter element selected from boron and silicon;

and optionally:

0 to 20%, preferably 0 to 15%, more preferably 0.1% to 10%, of phosphorous;

and optionally again:

0 to 20%, preferably 0.1% to 15%, more preferably 0.1% to 10%, of at least one element selected from group VIIA, preferably fluorine;

and optionally again:

0 to 20%, preferably 0.1% to 15%, more preferably 0.1% to 10%, of at least one element selected from group VIIB.

The group VIB, group VIII and group VIIB metals in the catalyst of the present invention can be completely or partially present in the form of the metal and/or oxide and/or sulphide.

The catalysts of the invention can be prepared using any suitable method. Preferably, at least one element selected from silicon and boron is introduced into a support already containing a zeolite selected from the group formed by NU-85, NU-86 and NU-87 zeolites, at least one matrix, as defined above, and the group VIB metal(s) and/or at least one group VIII element and optionally phosphorous. Preferably, the support is impregnated with at least one aqueous solution of at least one element selected from boron and silicon.

When the catalyst contains it, the silicon introduced to the support of the invention is principally located on the support matrix and can be characterized by techniques such as a Castaing microprobe (distribution profile of the various elements), transmission electron microscopy coupled with X ray analysis of the catalyst components, or by producing a distribution map of the elements present in the catalyst using an electronic microprobe. Such local analyses locate the various elements, in particular amorphous silica, on the support matrix due to introducing silicon in accordance with the invention. The location of the silica in the framework of the zeolite contained in the support is also revealed. Further, a quantitative estimate of the local silicon content and that of other elements can be made.

Further, $^{29}$Si solid NMR with magic angle rotation is a technique which can detect the presence of amorphous silica introduced into the catalyst using the method described in the present invention.

More particularly, a process for preparing the catalyst of the present invention comprises the following steps:

a) drying and weighing a solid termed the precursor, comprising at least the following compounds: at least one matrix, a zeolite selected from the group formed by NU-85, NU-86 and NU-87 zeolites, at least one element selected from the group formed by group VIB and group VIII metals, the whole preferably having been formed;

b) impregnating the solid precursor defined in step a) with at least one aqueous solution containing at least one element selected from boron and silicon, optionally phosphorous and optionally at least one group VIIA element, preferably fluorine (F), and optionally at least one group VIIB element;

c) leaving the moist solid in a moist atmosphere at a temperature in the range 10° C. to 80° C.;

d) drying the moist solid obtained in step b) at a temperature in the range 60° C. to 150° C.;

e) calcining the solid obtained from step c) at a temperature in the range 150° C. to 800° C.

Step b) above can be carried out using conventional methods known to the skilled person.

In one implementation of the invention when the catalyst contains boron, a preferred method consists of preparing an aqueous solution of at least one boron salt such as ammonium biborate or ammonium pentaborate in an alkaline medium and in the presence of hydrogen peroxide and carrying out dry impregnation, in which the pore volume of the precursor is filled with the boron-containing solution. When silicon is deposited, a solution of a silicone type silicon compound is used.

In a further implementation when the catalyst contains boron and silicon, the boron and silicon can be deposited simultaneously using a solution containing a boron salt and a silicone type silicon compound. Thus, in the case where the precursor is a nickel-molybdenum type catalyst supported on alumina, for example, it is possible to impregnate this precursor with an aqueous solution of ammonium biborate or Rhodorsil E1P silicone from Rhone Poulenc, drying at 80° C., for example, impregnating with an ammonium fluoride solution, then drying at 80° C., for example, then calcining, for example and preferably in air in a traversed bed, for example at 500° C. for 4 hours.

The element selected from boron and silicon, optionally phosphorous, optionally an element selected from group VIIA halide ions, preferably F, and optionally at least one element selected from group VIIB, can be introduced into the catalyst at various stages of the preparation and in a variety of manners, for example by one or more impregnation operations using an excess of solution on the calcined precursor.

The matrix is preferably impregnated using the "dry" impregnation method which is well known to the skilled person. Impregnation can be carried out in a single step using a solution containing all of the constituent elements of the final catalyst.

Thus, for example, it is possible to impregnate the precursor with an aqueous solution of ammonium biborate or Rhodorsil E1P silicone from Rhône Poulenc, drying at 80° C., for example, impregnating with an ammonium fluoride solution, then drying at 80° C., for example, then calcining, for example and preferably in air in a traversed bed, for example at 500° C. for 4 hours.

Other impregnation sequences can be carried out to obtain the catalyst of the present invention.

As an example, it is possible to impregnate the precursor with a solution containing phosphorous, to dry, calcine and to impregnate the solid obtained with a solution containing boron, then dry and calcine. It is also possible to impregnate the precursor with a solution containing phosphorous, to dry and calcine then to impregnate the solid obtained with a solution containing silicon, dry and then carry out a final calcining step.

Optional impregnation of at least one group VIIB element, for example molybdenum, can be facilitated by adding phosphoric acid to ammonium paramolybdate solutions, which also enables phosphorous to be introduced to promote the catalytic activity. Other phosphorous compounds can be used, as is well known to the skilled person.

When the metals are introduced by impregnating a number of times with the corresponding precursor salts, an intermediate drying step is generally carried out at a temperature generally in the range 60° C. to 250° C.

When the elements are introduced in a plurality of steps for impregnating the corresponding precursor salts, an intermediate calcining step must be carried out at a temperature in the range 250° C. to 600° C.

The precursor defined in step a) above which forms part of the composition of the catalyst of the invention comprises at least the following compounds: at least one matrix, a zeolite selected from the group formed by NU-85, NU-86 and NU-87 zeolites, at least one group VIB element, optionally at least one group VIII element, optionally boron or silicon, and optionally phosphorous, the ensemble preferably being formed.

The precursor can be prepared using any of the methods known to the skilled person. It is advantageously obtained by mixing the matrix and zeolites then forming. The hydrogenating element is introduced during mixing, or after mixing (preferred). Forming is followed by calcining; the hydrogenating element is introduced before or after calcining. Preparation is completed in all cases by calcining at a temperature of 250° C. to 600° C. One of the preferred methods used in the present invention consists of mixing at least one zeolite selected from the group formed by NU-85, NU-86 and NU-87 zeolites in a moist alumina gel for a few tens of minutes, then passing the paste obtained through a die to form extrudates with a diameter in the range 0.4 to 4 mm.

The hydrogenating function can be introduced only partially (in the case, for example of combinations of oxides of groups VIB and VIII metals) or completely on mixing the zeolite, i.e. at least one zeolite selected from the group formed by NU-85, NU-86 and NU-87 zeolites, with the gel of the oxide selected as the matrix. It can be introduced by one or more ion exchange operations carried out on the calcined support constituted by at least one zeolite selected from the group formed by NU-85, NU-86 and NU-87 zeolites dispersed in the selected matrix, using solutions containing precursor salts of the selected metals when these belong to group VIII. It can be introduced by one or more steps for impregnating the formed and calcined support using a solution of precursors of oxides of group VIII metals (in particular cobalt and nickel) when the precursors of oxides of group VIB metals (in particular molybdenum and tungsten) have already been introduced on mixing the support. Finally, it can be introduced by carrying out one or more impregnation operations on the calcined support constituted by at least one zeolite selected from the group formed by NU-85, NU-86 and NU-87 zeolites and the matrix, using solutions containing precursors of oxides of groups VI and/or VIII metals, the precursors of oxides of group VIII metals preferably being introduced after those of group VI or at the same time as the latter.

Sources of group VIB elements which can be used are well known to the skilled person. Examples of molybdenum and tungsten sources are oxides and hydroxides, molybdic acids and tungstic acids and their salts, in particular ammonium salts such as ammonium molybdate, ammonium heptamolybdate, ammonium tungstate, phosphomolybdic acid, phosphotungstic acid and their salts, silicomolybdic acid, silicotungstic acid and their salts. Preferably, oxides and ammonium salts are used, such as ammonium molybdate, ammonium heptamolybdate and ammonium tungstate.

The catalyst of the present invention can comprise a group VIII element such as iron, cobalt, nickel, ruthenium, rhodium, palladium, osmium or platinum. Preferred group VIII metals are non noble metals such as iron, cobalt or nickel. Advantageously, the following combinations of metals are used: nickel-molybdenum, cobalt-molybdenum, iron-molybdenum, iron-tungsten, nickel-tungsten, cobalt-tungsten. Preferred combinations are: nickel-molybdenum and cobalt-molybdenum. It is also possible to use combinations of three metals, for example nickel-cobalt-molybdenum.

The sources of the group VIII elements which can be used are well known to the skilled person. Examples of sources of non noble metals are nitrates, sulphates, phosphates, halides, for example chlorides, bromides and fluorides, and carboxylates, for example acetates and carbonates. Examples of sources of noble metals are halides, for example chlorides, nitrates, acids such as chloroplatinic acid, and oxychlorides such as ammoniacal ruthenium oxychloride.

A variety of silicon sources can be used. Examples are ethyl orthosilicate $Si(OEt)_4$, siloxanes, polysiloxanes, silicones, silicone emulsions and halogenated silicates such as ammonium fluorosilicate $(NH_4)_2SiF_6$ or sodium fluorosilicate $Na_2SiF_6$. Silicomolybdic acid and its salts, and silicotungstic acid and its salts can also advantageously be used. Silicon can be added, for example, by impregnating ethyl silicate in solution in a water/alcohol mixture. Silicon can also be added for example, by impregnation using a silicone type silicon compound suspended in water.

The boron source can be boric acid, preferably orthoboric acid $H_3BO_3$, ammonium biborate or pentaborate, boron oxide, or boric esters. Boron can, for example, be introduced in the form of a mixture of boric acid, hydrogen peroxide and a basic organic compound containing nitrogen, such as ammonia, primary and secondary amines, cyclic amines, pyridine group compounds, quinolines, and pyrrole group compounds. Boron can, for example, be introduced using a solution of boric acid in a water/alcohol mixture.

The preferred phosphorous source is orthophosphoric acid $H_3PO_4$, but its salts and esters such as ammonium phosphates are also suitable. Phosphorous can, for example, be introduced in the form of a mixture of phosphoric acid and a basic organic compound containing nitrogen, such as ammonia, primary and secondary amines, cyclic amines, pyridine group compounds, quinolines, and pyrrole group compounds.

Sources of group VIIA elements which can be used are well known to the skilled person. As an example, fluoride anions can be introduced in the form of hydrofluoric acid or its salts. These salts are formed with alkali metals, ammonium or an organic compound. In the latter case, the salt is advantageously formed in the reaction mixture by reacting the organic compound with hydrofluoric acid. It is also possible to use hydrolysable compounds which can liberate fluoride anions in water, such as ammonium fluorosilicate $(NH_4)_2SiF_6$, silicon tetrafluoride $SiF_4$ or sodium fluorosilicate $Na_2SiF_6$. Fluorine can be introduced, for example, by impregnating an aqueous hydrofluoride solution or ammonium fluoride.

Sources of group VIIB elements which can be used are well known to the skilled person. Ammonium salts, nitrates and chlorides are preferably used.

The catalysts obtained, in the form of oxides, can optionally be at least partially brought into the metal or sulphide form.

The catalysts obtained in the present invention are formed into grains of different shapes and dimensions. They are generally used in the form of cylindrical or polylobed extrudates such as bilobes, trilobes, or polylobes with a straight or twisted shape, but they can also be produced and used in the form of compressed powder, tablets, rings, beads or wheels. The specific surface area is measured by nitrogen adsorption using the BET method (Brunauer, Emmett, Teller, J. Am. Chem. Soc., vol. 60, 309–316 (1938)) and is in the range 50 to 600 m$^2$/g, the pore volume measured using a mercury porisimeter is in the range 0.2 to 1.5 cm$^3$/g and the pore size distribution may be unimodal, bimodal or polymodal.

The catalysts obtained in the present invention are used for hydrocracking hydrocarbon feeds such as petroleum cuts. The feeds used in the process are gasolines, kerosines, gas oils, vacuum gas oils, atmospheric residues, vacuum residues, atmospheric distillates, vacuum distillates, heavy fuels, oils, waxes and paraffins, spent oil, deasphalted residues or crudes, feeds from thermal or catalytic conversion processes, and their mixtures. They contain heteroatoms such as sulphur, oxygen and nitrogen and possibly metals.

The catalysts obtained are advantageously used for hydrocracking, in particular of vacuum distillate type heavy hydrocarbons, deasphalted residues or hydrotreated residues or the like. The heavy cuts are preferably constituted by at least 80% by volume of compounds with a boiling point of at least 350° C., preferably in the range 350° C. to 580° C. (i.e., corresponding to compounds containing at least 15 to 20 carbon atoms). They generally contain heteroatoms such as sulphur and nitrogen. The nitrogen content is usually in the range 1 to 5000 ppm by weight and the sulphur content is in the range 0.01% to 5% by weight.

The hydrocracking conditions such as temperature, pressure, hydrogen recycle ratio, and hourly space velocity, can vary widely depending on the nature of the feed, the quality of the desired products and the facilities available to the refiner. The temperature is generally over 200° C. and usually in the range 250° C. to 480° C. The pressure is over 0.1 MPa and usually over 1 MPa. The hydrogen recycle ratio is a minimum of 50 and usually in the range 80 to 5000 normal liters of hydrogen per liter of feed. The hourly space velocity is generally in the range 0.1 to 20 volumes of feed per volume of catalyst per hour.

The catalysts of the present invention preferably undergo sulphurisation to transform at least part of the metallic species to the sulphide before bringing them into contact with the feed to be treated. This activation treatment by sulphurisation is well known to the skilled person and can be carried out using any method already described in the literature.

One conventional sulphurisation method which is well known to the skilled person consists of heating in the presence of hydrogen sulphide to a temperature in the range 150° C. to 800° C., preferably in the range 250° C. to 600° C., generally in traversed bed reaction zone.

The catalyst of the present invention can advantageously be used for hydrocracking vacuum distillate type feeds with high sulphur and nitrogen contents.

In a first implementation, or partial hydrocracking, also known as mild hydrocracking, the degree of conversion is below 55%. The catalyst of the invention is thus used at a temperature which is generally 230° C. or more, preferably 300° C., generally over 480° C., and usually in the range 350° C. to 450° C. The pressure is generally over 2 MPa and preferably 3 MPa, less than 12 MPa and preferably less than 10 MPa. The quantity of hydrogen is a minimum of 100 normal liters of hydrogen per liter of feed and usually in the range 200 to 3000 normal liters of hydrogen per liter of feed. The hourly space velocity is generally in the range 0.1 to 10 h$^{-1}$. Under these conditions, the catalysts of the present invention have better activities for conversion, hydrodesulphuration and hydrodenitrogenation than commercially available catalysts.

In a second implementation, the catalyst of the present invention can be used for partial hydrocracking, advantageously under moderate hydrogen pressure conditions, to crack cuts, for example vacuum distillates containing high sulphur and nitrogen contents which have already been hydrotreated. The degree of conversion is below 55% in this hydrocracking mode. In this case, the petroleum cut is converted in two steps, the catalysts of the invention being used in the second step.

The catalyst of the first step can be any prior art hydrotreatment catalyst. This hydrotreatment catalyst advantageously comprises a matrix, preferably based on alumina and at least one metal with a hydrogenating function. The hydrotreatment function is ensured by at least one metal or metal compound, used alone or in combination, selected from group VIII and group VIB metals, such as nickel, cobalt, molybdenum or notably tungsten. Further, that catalyst can optionally contain phosphorous and optionally contain boron.

The first step is generally carried out at a temperature of 350–460° C. preferably 360–450° C., a total pressure of at least 2 MPa, preferably 3 MPa, and an hourly space velocity of 0.1–5h$^{-1}$ and preferably 0.2–2h$^{-1}$ and with a quantity of hydrogen at least 100 Nl/Nl of feed, preferably 260–3000 Nl/Nl of feed.

In the conversion step using the catalyst of the invention (or second step), the temperatures are generally 230° C. or more and usually in the range 300° C. to 480° C., preferably in the range 330° C. to 450° C. The pressure is generally at least 2 MPa, preferably 3 MPa; it is less than 12 MPa and preferably less than 10 MPa. The quantity of hydrogen is a minimum of 100 l/l of feed and usually in the range 200 to 3000 l/l of hydrogen per liter of feed. The hourly space velocity is generally in the range 0.15 to 10 h$^{-1}$. Under these conditions, the catalysts of the present invention have better activities for conversion, hydrodesulphuration, hydrodenitrogenation and a better selectivity for middle distillates than commercially available catalysts. The service life of the catalysts is also improved in the moderate pressure range.

In a further implementation, the catalyst of the present invention can be used for hydrocracking under high hydrogen pressure conditions of at least 5 MPa. The treated cuts are, for example, vacuum distillates containing high sulphur and nitrogen contents which have already been hydrotreated. In this hydrocracking mode, the degree of conversion is over 55%. In this case, the petroleum cut conversion process is carried out in two steps, the catalyst of the invention being used in the second step.

The catalyst of the first step can be any prior art hydrotreatment catalyst. This hydrotreatment catalyst advantageously comprises a matrix, preferably based on alumina, and at least one metal with a hydrogenating function. The hydrotreatment function is ensured by at least one metal or metal compound, used alone or in combination, selected from group VIII and group VIB metals such as nickel, cobalt, molybdenum and tungsten. Further, this catalyst may optionally contain phosphorous and boron.

The first step is generally carried out at a temperature of 350–460° C., preferably 360–450° C., with a pressure of over 3 MPa, an hourly space velocity of 0.1–5 h$^{-1}$ preferably 0.2–2 h$^{-1}$ and with a quantity of hydrogen of at least 100 Nl/Nl of feed, preferably 260–3000 Nl/Nl of feed.

For the conversion step using the catalyst of the invention (or second step), the temperatures are generally 230° C. or more, usually in the range 300° C. to 480° C., preferably in the range 300° C. to 440° C. The pressure is generally over 5 MPa, preferably over 7 MPa. The quantity of hydrogen is a minimum of 100 l/l of feed, usually in the range 200 to 3000 l/l of hydrogen per liter of feed. The hourly space velocity is generally in the range 0.15 to 10 h$^{-1}$.

Under these conditions, the catalysts of the present invention have better activities for conversion and better selectivities for middle distillates than prior art catalysts, even with considerably lower zeolite contents than those of commercially available catalysts.

The following examples illustrate the present invention without in any way limiting its scope.

EXAMPLE 1

Preparation of a Hydrocracking Catalyst Containing a NU-85 Zeolite

Large quantities of a hydrocracking catalyst support containing a NU-85 zeolite were produced so as to enable different catalysts based on the same support to be prepared.

The starting material used was a NU-85 zeolite prepared as described in Example 4 of EP-A2-0 462 745, with a global Si/Al atomic ratio of 13.1 and a Na/Al atomic ratio of 0.23.

This NU-85 zeolite first underwent dry calcining at 550° C. in a stream of dry air for 20 hours. The solid obtained underwent four ion exchange steps in a solution of 10 N NH$_4$NO$_3$ at about 100° C. for 4 hours for each exchange step. The solid obtained was designated as NH$_4$-NU-85/1 and had an Si/Al ratio of 13.8 and an Na/Al ratio of 0.005. Its other physico-chemical characteristics are shown in Table 1.

TABLE 1

| | Adsorption | |
|---|---|---|
| Sample | S$_{BET}$ (m$^2$/g) | V(P/P$_0$ = 0.19) ml liquid N$_2$/g |
| NH$_4$-NU-85/1 | 436 | 0.18 |

18.6 grams of H-NU-85 zeolite as prepared above was mixed then milled with 81.4 grams of a matrix composed of ultrafine tabular boehmite or alumina gel sold by Condea Chemie GmbH under the trade name SB3. This powder mixture was then mixed with an aqueous solution containing 66% nitric acid (7% by weight of acid per gram of dry gel) then milled for 15 minutes. After milling, the paste obtained was passed through a die with cylindrical orifices with a diameter of 1.4 mm. The extrudates were then dried and calcined at 500° C. for 2 hours in dry air.

EXAMPLE 2

Preparation of Hydrocracking Catalysts Containing a NU-85 Zeolite

Extrudates of the support of Example 1 were dry impregnated with an aqueous solution of a mixture of ammonium heptamolybdate and nickel nitrate, and finally calcined at 550° C. in situ in the reactor. The oxide weight contents of catalyst NU85NiMo obtained are shown in Table 2.

The support extrudates of Example 1 were dry impregnated with an aqueous solution of a mixture of ammonium heptamolybdate, nickel nitrate and orthophosphoric acid, and finally calcined at 550° C. in situ in the reactor. The oxide weight contents of catalyst NU85NiMoP obtained are shown in Table 2.

We then impregnated a sample of catalyst NU85NiMoP described above with an aqueous solution comprising ammonium biborate to deposit about 1.8% of B$_2$O$_3$. After ageing at room temperature in a water-saturated atmosphere, the impregnated extrudates were dried overnight at 120° C. then calcined for 2 hours at 550° C. in dry air. Catalyst NU85NiMoPB was obtained. A catalyst NU85NiMoPSi was obtained using the same procedure as that for NU85NiMoPB described above, replacing the boron precursor in the impregnation solution with a Rhodorsil EP1 silicone emulsion so as to deposit about 1.6% of SiO$_2$. Finally, catalyst NU85NiMoPBSi was obtained using the same procedure as that for the catalysts above but using an aqueous solution comprising ammonium biborate and Rhodorsil EP1 silicone emulsion to deposit about 1.8% of $B_2O_3$ and 1.6% of $SiO_2$. Fluorine was then added to this catalyst by impregnation using a dilute solution of hydrofluoric acid so as to deposit about 1% by weight of fluorine. After drying overnight at 120° C. and calcining at 550° C. for 2 hours in dry air, catalyst NU85NiMoPBSiF was obtained. The final oxide contents of the NU85NiMo catalysts are shown in Table 2.

Extrudates of the support containing a NU-85 zeolite of Example 1 were dry impregnated with an aqueous ammonium heptamolybdate solution, dried overnight at 120° C. in air and finally calcined in air at 550° C. The oxide weight contents of catalyst NU85Mo obtained are shown in Table 3.

The same impregnation steps were carried out on the NU85Mo catalyst sample to obtain catalysts NU85MoB, NU85 MoSi and NU85MoBSi. The final oxide contents of the NU85Mo catalysts are shown in Table 2.

TABLE 2

Characteristics of NU85Mo and NU85NiMo catalysts

| Catalyst | NU85Mo | NU85MoB | NU85MoSi | NU85MoBSi |
|---|---|---|---|---|
| $MoO_3$ (wt %) | 14.6 | 14.4 | 14.4 | 14.1 |
| $B_2O_3$ (wt %) | 0 | 1.8 | 0 | 1.75 |
| $SiO_2$ (wt %) | 14.8 | 14.5 | 16.1 | 15.9 |
| Complement to 100% mainly composed of $Al_2O_3$ (wt %) | 70.6 | 69.3 | 69.5 | 68.2 |

| Catalyst | NU85 NiMo | NU85 NiMoP | NU85 NiMoPB | NU85 NiMoPSi | NU85 NiMoPBSi | NU85 NiMoPBSiF |
|---|---|---|---|---|---|---|
| $MoO_3$ (wt %) | 14.3 | 13.7 | 13.5 | 13.5 | 13.2 | 13.1 |
| NiO (wt %) | 3.1 | 2.9 | 2.9 | 2.9 | 2.8 | 2.8 |
| $P_2O_5$ (wt %) | 0 | 4.8 | 4.8 | 4.7 | 4.7 | 4.6 |
| $B_2O_3$ (wt %) | 0 | 0 | 1.75 | 0 | 1.7 | 1.7 |
| Total $SiO_2$ (wt %) | 14.4 | 13.6 | 13.4 | 15.0 | 14.7 | 14.6 |
| F (wt %) | 0 | 0 | 0 | 0 | 0 | 1.15 |
| Complement to 100% mainly composed of $Al_2O_3$ (wt %) | 68.2 | 65.0 | 63.65 | 63.9 | 62.9 | 62.05 |

Catalyst NU85NiMoP was then impregnated with an aqueous solution comprising manganese nitrate to deposit about 2% of $MnO_2$. After ageing at room temperature in a water-saturated atmosphere, the impregnated extrudates were dried overnight at 120° C. then calcined at 550° C. for 2 hours in dry air. Catalyst NU85NiMoPMn was obtained. This catalyst was then impregnated with an aqueous solution containing ammonium biborate and a Rhodorsil EPI (Rhone Poulenc) silicone emulsion to deposit 1.8% of $B_2O_3$ and 1.6% of $SiO_2$. The impregnated extrudates were then dried overnight at 120° C. and calcined at 550° C. for 2 hours in dry air and catalyst NU85NiMoPMnBSi was obtained. Fluorine was then added to this catalyst by impregnating with a dilute hydrofluoric acid solution so as to deposit about 1% by weight of fluorine. After drying overnight at 120° C. and calcining at 550° C. for 2 hours in dry air, catalyst NU85NiMoPMnBSiF was obtained. The weight contents of these catalysts are shown in Table 4.

TABLE 3

Characteristics of NU85NiMo catalysts containing manganese

| Catalyst | NU85 NiMoPMn | NU85 NiMoPMnBSi | NU85 NiMoPMnBSiF |
|---|---|---|---|
| $MoO_3$ (wt %) | 13.4 | 13.0 | 12.9 |
| NiO (wt %) | 2.9 | 2.8 | 2.7 |
| $MnO_2$ (wt %) | 2.0 | 1.9 | 1.9 |
| $P_2O_5$ (wt %) | 4.75 | 4.6 | 4.6 |

TABLE 3-continued

Characteristics of NU85NiMo catalysts containing manganese

| Catalyst | NU85 NiMoPMn | NU85 NiMoPMnBSi | NU85 NiMoPMnBSiF |
|---|---|---|---|
| $B_2O_3$ (wt %) | 0 | 1.6 | 1.6 |
| $SiO_2$ (wt %) | 13.3 | 14.6 | 14.4 |
| F (wt %) | 0 | 0 | 0.96 |
| Complement to 100% mainly composed of $Al_2O_3$ (wt %) | 63.65 | 61.5 | 60.94 |

Electronic microprobe analysis of catalysts NU85NiMoPSi, NU85NiMoPBSi, NU85NiMoPBSiF (Table 2), catalysts NU85NiMoPMnBSi, NU85NiMoPMnBSiF (Table 3) and catalysts NU-85Mo, NU-85MoB, NU-85MoSi, NU-85MoBSi (Table 2) showed that the silicon added to the catalyst of the invention was mainly located on the matrix and was in the form of amorphous silica.

EXAMPLE 3

Preparation of a Support Containing a NU-85 Zeolite and a Silica-alumina

We produced a silica-alumina powder by co-precipitation, with a composition of 2% $SiO_2$ and 98% $Al_2O_3$. A support for a hydrocracking catalyst containing this silica-alumina and the NU-85 zeolite of Example 1 was then produced. To this end, 19.1% by weight of the NU-85 zeolite of Example 1 was mixed with 80.9% by weight of a matrix composed of the silica-alumina as prepared above. This powder mixture was mixed with an aqueous solution containing 66% nitric acid (7% by weight of acid per gram of dry gel) then milled for 15 minutes. After milling, the paste obtained was passed through a die having cylindrical orifices with a diameter of 1.4 mm. The extrudates were then dried overnight at 120° C. and calcined at 550° C. for 2 hours in air.

EXAMPLE 4

Preparation of Hydrocracking Catalysts Containing a NU-85 Zeolite and a Silica-alumina Support extrudates containing a silica-alumina and a NU-85 zeolite from Example 3 were dry impregnated using an aqueous solution of a mixture of ammonium heptamolybdate, nickel nitrate and orthophosphoric acid, dried overnight at 120° C. in air and finally calcined in air at 550° C. The oxide weight contents of catalyst NU85-SiAl-NiMoP obtained are shown in Table 4.

We impregnated the NU85-SiAl-NiMoP catalyst sample with an aqueous solution comprising ammonium biborate to impregnate 1.8% by weight of $B_2O_3$. After ageing at room temperature in a water-saturated atmosphere, the impregnated extrudates were dried overnight at 120° C. and calcined in dry air for 2 hours at 550° C. Catalyst NU85-SiAl-NiMoPB was obtained which thus contained silicon in its silica-alumina matrix.

The characteristics of the NU85-SiAl-NiMo catalysts are summarised in Table 4.

TABLE 4

Characteristics of NU85-SiAl-NiMo catalysts

| Catalyst | NU85-SiAl-NiMoP | NU85-SiAl-NiMoPB |
|---|---|---|
| $MoO_3$ (wt %) | 13.5 | 13.3 |
| NiO (wt %) | 2.8 | 2.8 |
| $P_2O_5$ (wt %) | 5.0 | 4.9 |
| $B_2O_3$ (wt %) | 0 | 1.7 |
| $SiO_2$ (wt %) | 15.3 | 15.0 |
| Complement to 100% mainly composed of $Al_2O_3$ (wt %) | 63.4 | 62.3 |

EXAMPLE 5

Preparation of a Support Containing NU-86 Zeolite

Large quantities of a hydrocracking catalyst support containing a NU-86 zeolite were produced so as to enable different catalysts based on the same support to be prepared. The starting material used was a NU-86 zeolite prepared as described in Example 2 of EP-A2-0 463 768, with a global Si/Al atomic ratio of 10.2 and a NA/Al atomic ratio of 0.25.

This as synthesised NU-86 zeolite first underwent dry calcining at 550° C. in a stream of dry air for 9 hours. The solid obtained underwent four ion exchange steps in a solution of 10 N $NH_4NO_3$ at about 100° C. for 4 hours for each exchange step. The solid obtained was designated as $NH_4$-NU-86/1 and had an Si/Al ratio of 10.4 and an Na/Al ratio of 0.013. The remaining physico-chemical characteristics are shown in Table 5.

TABLE 5

| | | | Adsorption |
|---|---|---|---|
| Sample | X ray diffraction Crystallinity (%) | $S_{BET}$ ($m^2$/g) | $V(P/P_0 = 0.19)$ ml liquid $N_2$/g |
| $NH_4$-NU-86/1 | 100 | 423 | 0.162 |

The NU-86 zeolite crystallites were in the form of crystals with a size of 0.4 μm to 2 μm.

Subsequently, 19.5 g of $NH_4$-NU-86/2 zeolite was mixed with 80.5 g of a matrix composed of ultrafine tabular boehmite or alumina gel from Condéa Chemie GmbH with trade name SB3. This mixture of powder was then mixed with an aqueous solution containing 66% nitric acid (7% by weight of acid per gram of dry gel) then mixed for 15 minutes. The mixed paste was extruded through a 1.2 mm die. The extrudates were calcined at 500° C. for 2 hours in air.

EXAMPLE 6

Preparation of Hydrocracking Catalysts Containing a NU-86 Zeolite

Preaparation of Example 2 was reproduced using extrudates of the support containing a NU-86 zeolite of Example 5.

The oxide weight contents of catalyst NU86NiLIo and NU-86Mo obtained are shown in Table 6.

TABLE 6

Characteristics of catalysts NU86Mo and NU86NiMo

| Catalyst | NU86Mo | NU86MoB | NU86MoSi | NU86MoBSi |
|---|---|---|---|---|
| $MoO_3$ (wt %) | 14.6 | 14.3 | 14.3 | 14.1 |
| $B_2O_3$ (wt %) | 0 | 1.8 | 0 | 1.6 |
| $SiO_2$ (wt %) | 15.2 | 14.9 | 16.6 | 16.1 |
| Complement to 100% mainly composed of $Al_2O_3$ (wt %) | 70.2 | 68.9 | 69.1 | 67.9 |

| Catalyst | NU86 NiMo | NU86 NiMoP | NU86 NiMoPB | NU86 NiMoPSi | NU86 NiMoPBSi | NU86 NiMoPBSiF |
|---|---|---|---|---|---|---|
| $MoO_3$ (wt %) | 14.1 | 13.4 | 13.2 | 13.2 | 12.9 | 12.8 |
| NiO (wt %) | 3.2 | 3.1 | 3.0 | 3.0 | 2.9 | 2.9 |
| $P_2O_5$ (wt %) | 0 | 4.1 | 4.1 | 4.1 | 4.0 | 4.0 |
| $B_2O_3$ (wt %) | 0 | 0 | 2.0 | 0 | 1.9 | 1.9 |
| $SiO_2$ (wt %) | 14.7 | 14.1 | 13.8 | 15.5 | 15.2 | 14.9 |
| F (wt %) | 0 | 0 | 0 | 0 | 0 | 1.1 |
| Complement to 100% mainly composed of $Al_2O_3$ (wt %) | 68.0 | 65.3 | 63.9 | 64.2 | 63.1 | 62.4 |

The weight contents of catalysts NU-86NiMoMn are shown in Table 7

TABLE 7

Characteristics of NU86NiMo catalysts containing manganese

| Catalyst | NU86 NiMoPMn | NU86 NiMoPMnBSi | NU86 NiMoPMnBSiF |
|---|---|---|---|
| $MoO_3$ (wt %) | 13.2 | 12.7 | 12.6 |
| NiO (wt %) | 3.0 | 2.9 | 2.9 |
| $MnO_2$ (wt %) | 2.1 | 2.0 | 2.0 |
| $P_2O_5$ (wt %) | 4.1 | 3.95 | 3.9 |
| $B_2O_3$ (wt %) | 0 | 1.9 | 1.9 |
| $SiO_2$ (wt %) | 13.8 | 14.8 | 14.7 |
| F (wt %) | 0 | 0 | 1.1 |
| Complement to 100% mainly composed of $Al_2O_3$ (wt %) | 63.8 | 61.75 | 60.9 |

Electronic microprobe analysis of catalysts NU86NiMoPSi, NU86NiMoPBSi, NU86NiMoPBSiF (Table 6) and catalysts NU86NiMoPMnBSi, NU86NiMoPMnBSiF (Table 7) showed that the silicon added to the catalyst of the invention was mainly located on the matrix and was in the form of amorphous silica.

EXAMPLE 7

Preparation of a Support Containing a NU-86 Zeolite and a Silica-alumina

Preparation of Example 3 was reproduced using zeolite NU-86 of Example

EXAMPLE 8

Preparation of Hydrocracking Catalysts Containing a NU-86 Zeolite and a Silica-alumina Preparation of Example 4 was reproduced using support extrudates containing a silica-alumina and a NU-86 zeolite from Example 7.

The characteristics of the NU86-SiAl-NiMo catalysts are summarised in Table 8.

TABLE 8

Characteristics of NU86-SiAl-NiMo catalysts

| Catalyst | NU86-SiAl-NiMoP | NU86-SiAl-NiMoPB |
|---|---|---|
| $MoO_3$ (wt %) | 13.4 | 13.3 |
| NiO (wt %) | 3.0 | 2.8 |
| $P_2O_5$ (wt %) | 4.2 | 4.1 |
| $B_2O_3$ (wt %) | 0 | 2.0 |
| $SiO_2$ (wt %) | 15.5 | 15.2 |
| Complement to 100% mainly composed of $Al_2O_3$ (wt %) | 63.9 | 62.6 |

EXAMPLE 9

Preparation of a Hydrocracking Catalyst Support Containing a NU-87 Catalyst

The starting material was an NU-87 zeolite with a global Si/Al atomic ratio of 17.2, and a sodium weight content corresponding to a Na/Al atomic ratio of 0.144. This NU-87 zeolite was synthesised as described in EP-A-0 377 291.

This NU-87 zeolite first underwent dry calcining at 550° C. in a stream of dry air for 6 hours. The solid obtained underwent four ion exchange steps in a solution of 10 N $NH_4NO_3$ at about 100° C. for 4 hours for each exchange step. The solid obtained was designated as $NH_4$-NU-87 and had an Si/Al ratio of 17.4 and an Na/Al ratio of 0.002. The remaining physico-chemical characteristics are shown in Table 9.

TABLE 9

| | X ray diffraction parameters | | | | | Crystalli nity[1] (%) | Adsorption | |
|---|---|---|---|---|---|---|---|---|
| Sample | a (Å) | b (Å) | c (Å) | β (°) | V (Å³) | | $S_{BET}$ (m²/g) | V[2] |
| NH4-NU-87 | 14.35 | 22.34 | 25.14 | 151.53 | 3840 | 100 | 466 | 0.19 |

[1]Crystallinity; [2]V at $P/P_0 = 0.19$, in ml liquid $N_2/g$

A hydrocracking catalyst support containing a NU-87 zeolite was produced as follows: 20% by weight of a NU-87 zeolite was mixed with 80% by weight of type SB3 alumina from Condea Chemie GmbH. The mixed paste was extruded through a 1.4 mm die. The extrudates were dried overnight at 120° C. then calcined at 500° C. for 2 hours in air.

EXAMPLE 10

Preparation of Hydrocracking Catalysts Containing a NU-87 Zeolite

Prepararing of Example 2 was reproduced using extrudates of the support containing a NU-87 zeolite of Example 9.

The final oxide contents of the NU87Mo and NU87NiMo catalysts are shown in Table 10.

The weight contents of NU87NiMoMn catalysts are shown in Table 11.

TABLE 11

| Characteristics of NU87NiMo catalysts containing manganese | | | |
|---|---|---|---|
| Catalyst | NU87 NiMoPMn | NU87 NiMoPMnBSi | NU87 NiMoPMnBSiF |
| $MoO_3$ (wt %) | 13.1 | 12.7 | 12.6 |
| NiO (wt %) | 3.1 | 3.0 | 2.9 |
| $MnO_2$ (wt %) | 1.9 | 1.8 | 1.8 |
| $P_2O_5$ (wt %) | 4.3 | 4.1 | 4.1 |
| $B_2O_3$ (wt %) | 0 | 1.9 | 1.9 |

TABLE 10

| Characteristics of catalysts NU87Mo and NU87NiMo | | | | |
|---|---|---|---|---|
| Catalyst | NU87Mo | NU87MoB | NU87MoSi | NU87MoBSi |
| $MoO_3$ (wt %) | 14.3 | 14.0 | 14.0 | 13.8 |
| $B_2O_3$ (wt %) | 0 | 1.9 | 0 | 1.8 |
| $SiO_2$ (wt %) | 15.4 | 15.1 | 16.6 | 16.3 |
| Complement to 100% mainly composed of $Al_2O_3$ (wt %) | 70.3 | 69.0 | 69.3 | 68.1 |

| Catalyst | NU87 NiMo | NU87 NiMoP | NU87 NiMoPB | NU87 NiMoPSi | NU87 NiMoPBSi | NU87 NiMoPBSiF |
|---|---|---|---|---|---|---|
| $MoO_3$ (wt %) | 13.4 | 13.4 | 13.1 | 13.1 | 12.9 | 12.8 |
| NiO (wt %) | 3.1 | 3.1 | 3.1 | 3.1 | 3.0 | 3.0 |
| $P_2O_5$ (wt %) | 0 | 4.35 | 4.3 | 4.2 | 4.2 | 4.2 |
| $B_2O_3$ (wt %) | 0 | 0 | 1.8 | 0 | 1.7 | 1.7 |
| $SiO_2$ (wt %) | 14.8 | 14.3 | 14.0 | 15.5 | 15.3 | 15.1 |
| F (wt %) | 0 | 0 | 0 | 0 | 0 | 0.9 |
| Complement to 100% mainly composed of $Al_2O_3$ (wt %) | 68.7 | 64.85 | 63.7 | 64.1 | 62.9 | 62.3 |

TABLE 11-continued

Characteristics of NU87NiMo catalysts containing manganese

| Catalyst | NU87 NiMoPMn | NU87 NiMoPMnBSi | NU87 NiMoPMnBSiF |
|---|---|---|---|
| SiO$_2$ (wt %) | 13.9 | 14.8 | 14.7 |
| F (wt %) | 0 | 0 | 0.9 |
| Complement to 100% mainly composed of Al$_2$O$_3$ (wt %) | 63.7 | 61.7 | 61.1 |

Electronic microprobe analysis of catalysts NU87NiMoPSi, NU87NiMoPBSi, NU87NiMoPBSiF (Table 10) and catalysts NU87NiMoPMnBSi, NU87NiMoPMnBSiF (Table 11) showed that the silicon added to the catalyst of the invention was mainly located on the matrix and was in the form of amorphous silica.

EXAMPLE 11

Preparation of a Support Containing a NU-87 Zeolite and a Silica-Alumina

Preparation of Example 3 was reproduced using zeolite NU-87.

EXAMPLE 12

Preparation of Hydrocracking Catalysts Containing a NU-87 Zeolite and a Silica-Alumina Preparation of Example 4 was reproduced using support extrudates containing a silica-alumina and a NU-87 zeolite from Example 11.

The characteristics of the NU87-SiAl-NiMo catalysts are summarised in Table 12.

TABLE 12

Characteristics of NU87-SiAl-NiMo catalysts

| Catalyst | NU87-SiAl-NiMoP | NU87-SiAl-NiMoPB |
|---|---|---|
| MoO$_3$ (wt %) | 13.4 | 13.1 |
| NiO (wt %) | 3.0 | 2.9 |
| P$_2$O$_5$ (wt %) | 4.2 | 4.1 |
| B$_2$O$_3$ (wt %) | 0 | 2.0 |
| SiO$_2$ (wt %) | 16.4 | 16.1 |
| Complement to 100% mainly composed of Al$_2$O$_3$ (wt %) | 63.1 | 61.9 |

EXAMPLE 13

Comparison of Catalysts for Partial Conversion Hydrocracking of a Vacuum Gas Oil The catalysts prepared in the above examples were employed under moderate pressure hydrocracking conditions using a petroleum feed with the following principal characteristics:

| | |
|---|---|
| Density (20/4) | 0.921 |
| Sulphur (weight %) | 2.46 |
| Nitrogen (ppm by weight) | 1130 |
| Simulated distillation | |
| Initial point | 365° C. |
| 10% point | 430° C. |
| 50% point | 472° C. |
| 90% point | 504° C. |
| End point | 539° C. |
| Pour point | +39° C. |

The catalytic test unit comprised two fixed bed reactors in upflow mode. Catalyst HTH548 from Procatalyse for the first hydrotreatment step of the process,. comprising a group VI element and a group VIII element deposited on alumina, was introduced into the first reactor, through which the feed passed first. A hydrocracking catalyst as described above was introduced into the second reactor, through which the feed passed last. 40 ml of catalyst was introduced into each of the reactors. The two reactors operated at the same temperature and the same pressure. The operating conditions of the test unit were as follows:

| | |
|---|---|
| Total pressure | 5 MPa |
| Hydrotreatment catalyst | 40 cm$^3$ |
| Hydrocracking catalyst | 40 cm$^3$ |
| Temperature | 400° C. |
| Hydrogen flow rate | 20 l/h |
| Feed flow rate | 40 cm$^3$/h |

The two catalysts underwent in-situ sulphurisation before the reaction. It should be noted that any in-situ or ex-situ sulphurisation method is suitable. Once sulphurisation had been carried out, the feed described above could be transformed.

The catalytic performances are expressed as the gross conversion at 400° C. (GC), the gross selectivity for middle distillates (GS) and the hydrodesulphuration (HDS) and hydrodenitrogenation (HDN) conversions. These catalytic performances were measured for the catalyst after a stabilisation period, generally of at least 48 hours, had passed.

The gross conversion GC is taken to be:

GC=weight % of 380° C.$^{minus}$ of effluent.

The gross selectivity GS for middle distillates is taken to be:

GS=100* weight of (150° C.–380° C.) fraction/weight of 380° C.$^{minus}$ fraction of effluent.

The hydrodesulphuration conversion HDS is taken to be:

HDS=(S$_{initial}$–S$_{effluent}$)/S$_{initial}$*100=(24600–S$_{effluent}$)/24600*100

The hydrodenitrogenation conversion HDN is taken to be:

HDN=(N$_{initial}$–N$_{effluent}$)/N$_{initial}$*100=(1130–N$_{effluent}$)/1130*100

The following table shows the gross conversion GC at 400° C., the gross selectivity GS, the hydrodesulphuration conversion HDS and the hydrodenitrogenation conversion HDN for the catalysts.

TABLE 13

Catalytic activities of catalysts for partial hydrocracking at 400° C.

| | GC (wt %) | GS (%) | HDS (%) | HDN (%) |
|---|---|---|---|---|
| NiMo/NU-85 | 45.5 | 70.8 | 99.01 | 94.2 |
| NiMoP/NU-85 | 45.8 | 70.1 | 99.33 | 95.9 |
| NiMoPB/NU-85 | 46.2 | 70.8 | 99.47 | 96.9 |
| NiMoPSi/NU-85 | 46.8 | 70.9 | 99.52 | 97.8 |
| NiMoPBSi/NU-85 | 48.1 | 70.1 | 99.61 | 98.6 |
| NiMoP/Nu85-SiAl | 45.7 | 70.1 | 98.28 | 95.5 |
| NiMoPB/Nu85-SiAl | 46.2 | 70.7 | 98.16 | 97.7 |
| NiMo/NU-86-Al | 49.6 | 59.7 | 98.7 | 95.7 |
| NiMoP/NU-86-Al | 49.6 | 60.2 | 99.3 | 96.2 |
| NiMoPB/NU-86-Al | 49.9 | 61.3 | 99.4 | 97.1 |
| NiMoP/Nu86-SiAl | 49.7 | 59.5 | 98.3 | 95.5 |
| NiMoPB/Nu86-SiAl | 46.2 | 59.9 | 98.1 | 97.7 |
| NiMoPSi/NU-86-Al | 50.2 | 59.9 | 99.6 | 97.9 |
| NiMoPBSi/NU-86-Al | 50.5 | 60.4 | 99.7 | 98.1 |
| NiMo/NU-87-Al | 47.7 | 68.1 | 98.6 | 95.0 |
| NiMoP/NU-87-Al | 47.8 | 68.2 | 99.1 | 95.3 |
| NiMoPB/NU-87-Al | 48.4 | 68.4 | 99.3 | 96.4 |
| NiMoP/Nu87-SiAl | 46.7 | 69.5 | 98.3 | 95.5 |
| NiMoPB/Nu87-SiAl | 46.2 | 68.3 | 98.1 | 96.3 |
| NiMoPSi/NU87-M | 48.6 | 68.9 | 99.4 | 98.1 |
| NiMoPBSi/NU-87-Al | 49.1 | 68.1 | 99.6 | 98.3 |

The results of Table 13 show that adding B and/or Si to NiMo and NiMoP catalysts improved the performances of the catalyst for conversion whether the zeolite was NU-85, NU-86 or NU-87. The activity of the catalysts of the invention (NiMoB, NiMoSi, NiMoPBSi) was higher, i.e., higher conversions for the same reaction temperature of 400° C., than the catalysts which were not in accordance with the invention (NiMo, NiMoP). Catalysts of the invention containing boron and/or silicon are thus particularly important for partial hydrocracking of vacuum distillate type feeds containing nitrogen at moderate hydrogen pressures.

Further, the results of Table 13 show that it is advantageous to introduce the silica into the prepared catalyst rather than in the form of a support containing silicon obtained from a silica-alumina SiAl-NiMo. It is thus of particular advantage to introduce silicon to a precursor already containing group VIB and/or VIII elements and optionally at least one of elements P, B and F.

EXAMPLE 14

Comparison of Catalysts for High Conversion Hydrocracking of a Vacuum Gas Oil

The catalysts prepared in the above examples were used under high conversion (60–100%) hydrocracking conditions. The petroleum feed was a hydrotreated vacuum distillate with the following principal characteristics:

| Density (20/4) | 0.869 |
|---|---|
| Sulphur (ppm by weight) | 502 |
| Nitrogen (ppm by weight) | 10 |
| Simulated distillation | |
| Initial point | 298° C. |
| 10% point | 369° C. |
| 50% point | 427° C. |
| 90% point | 481° C. |
| End point | 538° C. |

This feed had been obtained by hydrotreatment of a vacuum distillate using a HR360 catalyst from Procatalyse comprising a group VIB element and a group VIII element deposited on alumina.

0.6% by weight of aniline and 2% by weight of dimethyldisulphide were added to the feed to simulate the partial pressures of $H_2S$ and $NH_3$ present in the second hydrocracking step. The prepared feed was injected into the hydrocracking test unit which comprised one fixed bed reactor in upflow mode, into which 80 ml of catalyst had been introduced. The catalyst was sulphurised using a n-hexane/DMDS+ aniline mixture at 320° C. It should be noted that any in-situ or ex-situ sulphurisation method is suitable. Once sulphurisation had been carried out the feed described above could be transformed. The operating conditions of the test unit were as follows:

| Total pressure | 9 MPa |
|---|---|
| Catalyst | 80 cm³ |
| Temperature | 360–420° C. |
| Hydrogen flow rate | 80 l/h |
| Feed flow rate | 80 cm³/h |

The catalytic performances are expressed as the temperature at which a gross conversion of 70% is produced and by the gross selectivity for 150–380° C. middle distillates. These catalytic performances were measured for the catalyst after a stabilisation period, generally of at least 48 hours, had passed.

The gross conversion GC is taken to be:

GC=weight % of 380°C.$^{minus}$ of effluent.

380° C.$^{minus}$ represents the fraction distilled at a temperature of 380° C. or less.

The gross selectivity GS for middle distillates is taken to be:

GS=100* weight of (150° C.–380° C.) fraction/weight of 380° C.$^{minus}$ fraction of effluent.

The reaction temperature was fixed so as to obtain a gross conversion GC of 70% by weight. Table 14 below shows the reaction temperature and gross selectivity.

TABLE 14

Catalytic activities of catalysts for high conversion (70%) hydrocracking

| | T(°C.) | GS |
|---|---|---|
| NiMo/NU-85 | 386 | 31.7 |
| NiMoP/NU-85 | 385 | 31.7 |
| NiMoPB/NU-85 | 383 | 32.0 |
| NiMoPSi/NU-85 | 384 | 32.1 |
| NiMoPBSi/NU-85 | 383 | 32.4 |
| NiMoPBSiF/NU-85 | 382 | 32.7 |
| NiMoPMn/NU-85 | 384 | 31.9 |
| NiMoPMnBSi/NU-85 | 382 | 32.1 |
| NiMoPMnBSiF/NU-85 | 381 | 32.9 |
| Mo/NU-85 | 387 | 29.3 |
| MoB/NU-85 | 386 | 29.9 |
| MoSi/NU-85 | 386 | 30.1 |
| MoBSi/NU-85 | 384 | 30.4 |
| NiMo/NU-86 | 373 | 36.0 |
| NiMoP/NU-86 | 371 | 36.2 |
| NiMoPB/NU-86 | 370 | 36.3 |
| NiMoPSi/NU-86 | 369 | 37.4 |
| NiMoPBSi/NU-86 | 367 | 36.3 |
| NiMoPBSiF/NU-86 | 365 | 37.1 |
| NiMoPMn/NU-86 | 371 | 37.3 |
| NiMoPMnBSi/NU-86 | 368 | 37.1 |
| NiMoPMnBSiF/NU-86 | 365 | 37.4 |
| Mo/NU-86 | 373 | 34.1 |
| MoB/NU-86 | 373 | 33.9 |
| MoSi/NU-86 | 372 | 33.0 |
| MoBSi/NU-86 | 371 | 33.6 |
| NiMo/NU-87 | 384 | 30.6 |

TABLE 14-continued

Catalytic activities of catalysts for high conversion (70%) hydrocracking

|  | T(°C.) | GS |
|---|---|---|
| NiMoP/NU-87 | 383 | 32.5 |
| NiMoPB/NU-87 | 380 | 32.9 |
| NiMoPSi/NU-87 | 379 | 32.7 |
| NiMoPBSi/NU-87 | 378 | 32.3 |
| NiMoPBSiF/NU-87 | 376 | 34.4 |
| NiMoPMn/NU-87 | 380 | 32.9 |
| NiMoPMnBSi/NU-87 | 378 | 33.4 |
| NiMoPMnBSiF/NU-87 | 375 | 34.1 |
| Mo/NU-87 | 385 | 30.6 |
| MoB/NU-87 | 384 | 30.3 |
| MoSi/NU-87 | 383 | 29.6 |
| MoBSi/NU-87 | 383 | 29.1 |

Adding boron and/or silicon to catalysts containing a zeolite from the group NU-85, NU-86 and NU-87 improved the conversion activity, resulting in a reduction in the reaction temperature necessary to attain 70% conversion. Further, if manganese and/or fluorine was added, the converting activity also improved, with a substantial improvement in the gross selectivity for middle distillates. This effect can be attributed to a hydrogenating function enhanced by Mn and/or F dopants.

Catalysts containing NU-85, NU-86 or NU-87 zeolite of the invention containing boron and silicon are thus of particular importance for high conversion hydrocracking of vacuum distillate type feeds at moderate hydrogen pressures.

The preceding examples can be repeated with similar success by substituting the generically or specifically described reactants and/or operating conditions of this invention for those used in the preceding examples. Also, the preceding specific embodiments are to be construed as merely illustrative, and not limitative of the remainder of the disclosure in any way whatsoever.

The entire disclosure of all applications, patents and publications, cited above and below, and of corresponding French applications 98/02.313 and 98/02.441, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A catalyst comprising a support containing at least one matrix and at least one zeolite selected from the group consisting of NU-85, NU-86 and NU-87 zeolite, said catalyst further comprising at least one metal selected from the group consisting of group VIB and group VIII metals of the periodic table and at least one element selected from the group consisting of silicon and boron as a promoter.

2. A catalyst according to claim 1 comprising a NU-85 zeolite.

3. A catalyst according to claim 1 comprising a NU-86 zeolite.

4. A catalyst according to claim 1 comprising a NU-87 zeolite.

5. A catalyst according to claim 1 which contains phosphorous.

6. A catalyst according to claim 5 which further comprises at least one element selected from group VIIA of the periodic table.

7. A catalyst according to claim 5 which further comprises at least one element selected from group VIIB of the periodic table.

8. A catalyst according to claim 6 which further comprises at least one element selected from group VIIB of the periodic table.

9. A catalyst according to claim 1 which further comprises at least one element selected from group VIIA of the periodic table.

10. A catalyst according to claim 1 which further comprises at least one element selected from group VIIB of the periodic table.

11. A catalyst according to claim 1 wherein the silicon is introduced in its amorphous form.

12. A catalyst according to claim 1 in which the zeolite is in its hydrogen form.

13. A process for preparing a catalyst according to claim 1 in which the following steps are carried out:
   a) drying and weighing a solid precursor comprising at least the following compounds: at least one matrix, a zeolite selected from the group consisting of NU-85, NU-86 and NU-87 zeolites, at least one element selected from the group consisting of group VIB and group VIII metals;
   b) impregnating the solid precursor defined in step a) using at least one aqueous solution containing at least one element selected from the group consisting of boron and silicon;
   c) leaving the moist solid obtained from step b) in a moist atmosphere at a temperature in the range 10° C. to 80° C.;
   d) drying the moist solid obtained in the step c) at a temperature in the range 60° C. to 150° C.;
   e) calcining the solid obtained from step d) at a temperature in the range 150° C. to 800° C.

14. A process for preparing a catalyst according to claim 13, in which in step b), at least one element selected from the group consisting of phosphorous, group VIIA elements and group VIIB elements is also introduced.

15. A process for preparing a catalyst according to claim 13 in which a calcining and a drying step are carried out between each element impregnation step.

16. A method of using a catalyst according to claim 1 which comprises hydrocracking a hydrocarbon feed with said catalyst.

17. A method according to claim 16, in which the hydrocarbon feed is constituted by at least 80% by volume of compounds with a boiling point of at least 350° C.

18. A method according to claim 16 in which during hydrocracking, the temperature is over 200° C., the pressure is over 0.1 MPa, with a hydrogen recycle ratio of over 50 normal liters of hydrogen per liter of feed, and the HSV is in the range 0.1 to 20 h$^{-1}$.

19. A method according to claim 16 wherein a partial hydrocracking is performed with a degree of hydrocarbon conversion of less than 55%.

20. A method according to claim 19, in which, during hydrocracking, the temperature is 230° C. or more, the pressure is over 2 MPa, the quantity of hydrogen is over 100 normal litres of hydrogen per liter of feed and the hourly space velocity is in the range 0.1 to 10 h$^{-1}$.

21. A method according to claim 16 wherein the degree of hydrocarbon conversion is over 55%.

22. A method according to claim 21, in which during hydrocracking the temperature is 230° C. or more, the pressure is over 5 MPa, the quantity of hydrogen is over 100 normal litres of hydrogen per liter of feed and the hourly space velocity is in the range 0.15 to 10 h$^{-1}$.

23. A method according to claim 16 in which prior to hydrocracking a hydrotreatment step is carried out at a temperature in the range 350° C. to 460° C., at a pressure of over 3 MPa, with a quantity of hydrogen of over 100 normal liters of hydrogen per liter of feed, with an hourly space velocity in the range 0.1 to 5 $h^{-1}$ and in the presence of a hydrotreatment catalyst.

24. A catalyst comprising, by weight with respect to the catalyst:

0.1% to 60% of at least one metal selected from the group consisting of group VIB and group VIII metals:

0.1% to 90% of at least one zeolite selected from the group consisting of NU-85, NU-86 and NU-87 zeolite;

0.1% to 99% of at least one amorphous or low crystallinity mineral matrix;

0.1% to 20% of at least one promoter element selected from the group consisting of boron and silicon;

0 to 20% of phosphorous;

0 to 20% of at least one element selected from group VIIA;

0 to 20% of at least one element selected from group VIIB.

* * * * *